(12) United States Patent
Myttenaere

(10) Patent No.: US 7,021,531 B2
(45) Date of Patent: Apr. 4, 2006

(54) PAYMENT DEVICE

(75) Inventor: Yves De Myttenaere, Avenue des Buissons 21, B-1640, Rhode-Saint-Genése (BE)

(73) Assignees: Yves De Myttenaere, (BE); Maxcard Company SPRL, (BE)

( * ) Notice: Subject to any disclaimer, the term of this patent is extended or adjusted under 35 U.S.C. 154(b) by 0 days.

(21) Appl. No.: 10/483,337

(22) PCT Filed: Jul. 10, 2002

(86) PCT No.: PCT/BE02/00120

§ 371 (c)(1), (2), (4) Date: May 18, 2004

(87) PCT Pub. No.: WO03/012751

PCT Pub. Date: Feb. 13, 2003

(65) Prior Publication Data

US 2004/0188516 A1  Sep. 30, 2004

(30) Foreign Application Priority Data

Jul. 13, 2001 (EP) .................................. 01202693

(51) Int. Cl.
*G06K 5/00* (2006.01)
(52) U.S. Cl. ........................ 235/380; 235/379; 705/1; 705/14; 705/16; 705/41; 705/53
(58) Field of Classification Search ................ 235/380, 235/379; 705/14, 41, 65, 1, 16, 53
See application file for complete search history.

(56) References Cited

U.S. PATENT DOCUMENTS 6,000,608 A  12/1999  Dorf 6,601,761 B1 *  8/2003  Katis ........................... 235/379

(Continued)

FOREIGN PATENT DOCUMENTS

| EP | 1 050 835 | 11/2000 |
| GB | 2 298 505 | 9/1996 |
| WO | WO 95 21428 | 8/1995 |

*Primary Examiner*—Jared J. Fureman
*Assistant Examiner*—Allyson N Trail
(74) *Attorney, Agent, or Firm*—DLA Piper Rudnick Gray Cary US LLP

(57) ABSTRACT

A payment device including an input unit arranged to receive first data taken from a medium and identifying a user who will proceed with a payment for a purchase which he has made, the input unit being arranged to be connected to a first terminal intended to be placed at a point of sale, the first terminal having a data input intended to receive second data concerning the purchase, the first terminal arranged to communicate the first and second data to a second terminal intended to be placed with a financial body which will be responsible for making the payment on behalf of the user, the device also comprising a third terminal placed at a payment management center, the third terminal arranged to manage the communication between the first and second terminals, the third terminal having a first calculation unit arranged to process payments in cash and a second calculation unit arranged to process payments in compensatory value from a non-financial credit accumulated by the user, the input unit (2) provided with selection means for indicating either a payment mode in cash or a payment mode in compensatory value and to produce a first control signal if the payment mode in cash is selected and a second control signal if the compensatory value mode is chosen, the third terminal also being arranged to receive the first and second control signals and to execute the payment under the control of the second control signal and to transmit the first and second data to the second terminal under the control of the first control signal.

7 Claims, 4 Drawing Sheets

U.S. PATENT DOCUMENTS

| | | |
|---|---|---|
| 6,937,995 B1* | 8/2005 | Kepecs .................... 705/14 |
| 2001/0037241 A1* | 11/2001 | Puri ......................... 705/14 |
| 2001/0054003 A1* | 12/2001 | Chien et al. ............. 705/14 |
| 2002/0038287 A1* | 3/2002 | Villaret et al. ........... 705/41 |
| 2002/0057289 A1* | 5/2002 | Crawford et al. ........ 345/744 |
| 2004/0083183 A1* | 4/2004 | Hardesty et al. ........ 705/65 |
| 2004/0210448 A1* | 10/2004 | Breck et al. ............. 705/1 |
| 2005/0021400 A1* | 1/2005 | Postrel .................... 705/14 |
| 2005/0144074 A1* | 6/2005 | Fredregill et al. ....... 705/14 |
| 2005/0171848 A1* | 8/2005 | Walker et al. ........... 705/14 |

\* cited by examiner

PAYMENT DEVICE

RELATED APPLICATIONS

This is a 371 of PCT/BE02/00120 filed Jul. 10, 2002, which claims benefit from European Application No. 01202693.6 filed Jul. 13, 2001 and European Application No. 02100057.5 filed Jan. 24, 2002.

FIELD OF THE INVENTION

This invention relates to a payment device using a card with a magnetic strip or an electronic chip.

BACKGROUND OF THE INVENTION

Cards with a magnetic strip or an electronic chip are known for carrying out various functions. Thus some cards fulfill a credit means function with various financial institutions or credit bodies, others a function of means of debiting accounts of the holder of said card within such institutions. Another type of card assumes a function of loyalty means for a client with a commercial store or chain, enabling the holder of the card to accumulate units of compensation value by means of which he can acquire products distributed by the store or chain or benefit from reductions on these products or promotional services offered by this store or chain to the holders of units of compensatory value.

Cards with a magnetic strip able to simultaneously fulfill various functions also exist. Thus, U.S. Pat. No. 6,000,608 describes a magnetic strip card system in which such a card can fulfill the functions of prepaid debit card issued by a store or chain, a telephone card, a loyalty card and a medical information card. Such a system comprises a terminal for reading cards with a magnetic strip connected to a management unit of a banking institution and to a processing center. The processing center comprises or is connected to a database for each function of the card and manages the use of these various functions by the user of the card. The store or chain issuing a prepaid debit card can recompense the holder for his purchases with units of compensatory value managed by the database relating to the loyalty card function. The issuing store or chain can also make it possible for the card issued also to be used as a telephone card, an instruction when the card is used then activating the database relating to the debit card or telephone card function at the processing center. Alternatively, a card according to the system in question may fulfill solely the loyalty card function rather than debit card function. The units of compensatory value capitalized by the database of the processing center relating to the function in question can then be used for purchasing products from the issuing store or chain from the issuing manufacturer, in the latter case from any store or chain distributing its products, once the number of units of compensatory value capitalized has reached a predetermined threshold. These various functions can be combined.

The system according to U.S. Pat. No. 6,000,608 poses a problem of flexibility and versatility. This is because, firstly, when the debit card function is fulfilled, it is necessary for the card to be prepaid and consequently linked to a specific account associated with the issuing store or chain or manufacturer. The user can therefore not use the card described as a debit card or traditional credit card for making purchases in points of sale not linked to the issuing store or chain or manufacturer. Moreover, there is no possibility for the user of the card to determine himself at any time whether he wishes to make purchases in cash or units of compensatory value capitalized in the database relating to the loyalty card function, since these units of compensatory value can be used only once a given threshold is reached. Finally, each card issued by a store or chain or manufacturer can function only in relation to the products of this store or chain or manufacturer. In particular, the units of compensatory value capitalized in the database of the processing center relating to the loyalty card function can be used only at the store or chain or distributors of the products of the manufacturer who have granted the said units of compensatory value to the card user.

SUMMARY OF THE INVENTION

This invention relates to a payment device including an input unit for receiving first data taken from a medium and identifying a user who will proceed with a payment for a purchase. The input unit is arranged for connection to a first terminal to be located at a point of sale, the first terminal having a data input for receiving second data concerning said purchase. The first terminal communicates the first and second data to a second terminal placed with a financial body which is responsible for making payment on behalf of the user. A third terminal is placed at a payment management center, the third terminal managing communication between the first and second terminals, the third terminal having a first calculation unit for processing payments in cash and a second calculation unit for processing payments in compensatory value from a non-financial credit accumulated by the user. The input unit is provided with a selector to indicate either a payment mode in cash or a payment mode in compensatory value and to produce a first control signal if the payment mode in cash is selected and a second control signal if the compensatory value mode is chosen. The third terminal also receives the first and second control signals and executes payment under control of the second control signal and transmits the first and second data to the second terminal under the control of the first control signal.

DETAILED DESCRIPTION

Figure 1:
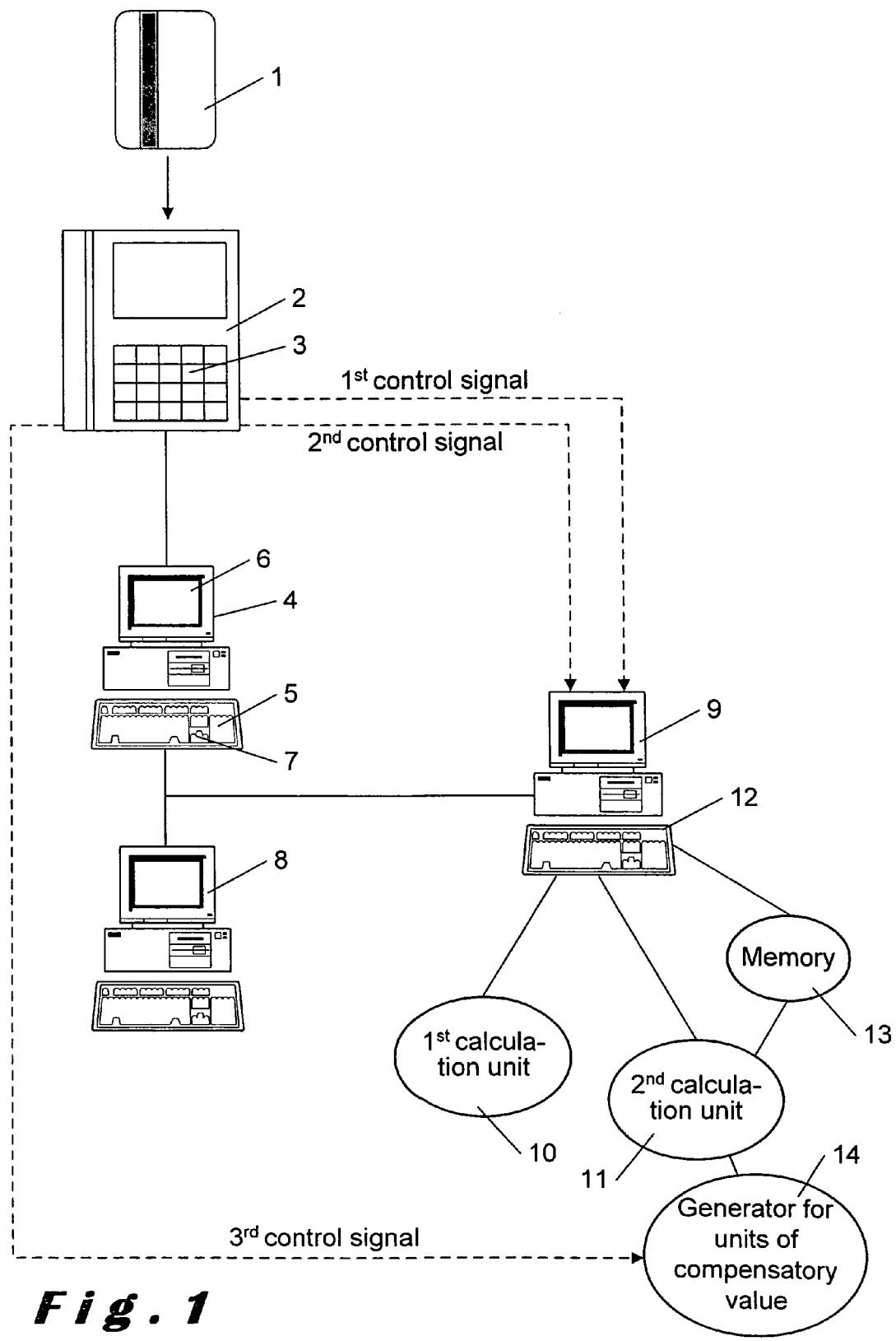
FIG. 1 is a schematic diagram of a payment device in accordance with aspects of the invention.

This invention resolves various problems by providing a payment device using a data medium, for example, a card with a magnetic strip or electronic chip, in which one and the same card can be used as a debit card and/or traditional credit card and, alternatively, as a loyalty card, the last function being fulfilled so that units of compensatory value capitalized with a store or chain can be used according to a program defined by the latter in its various points of sale but also, according to the same program or a different program, with other stores or chains which have made agreements with the first.

Consequently a payment device according to the invention comprises an input unit arranged to receive first data taken from a medium and identifying a user who will proceed with a payment for a purchase which he has made, the input unit being arranged to be connected to a first terminal intended to be placed at a point of sale, this first terminal having a data input intended to receive second data concerning the purchase, the first terminal being arranged to communicate the first and second data to a second terminal intended to be placed with a financial body which will be responsible for making the payment on behalf of the user, the device also comprising a third terminal intended to be placed at a payment management center, said third terminal being arranged to manage the communication between the first and second terminals, this third terminal having a first calculation unit arranged to process payments in cash and a second calculation unit arranged to process payments in compensatory value from a non-financial credit accumulated by the user, the input unit being provided with selection means for indicating either a payment mode in cash or a payment mode in compensatory value and to produce a first control signal if the payment mode in cash is selected and a second control signal if the compensatory value mode is chosen, the third terminal also being arranged to receive the first and second control signals and to execute the payment under the control of the second control signal and to transmit the first and second data to the second terminal under the control of the first control signal.

Such a device has several advantages. First of all, it allows the payment for purchases by a traditional debit or credit function via any financial body with which a second terminal is placed. Thus, from agreements made between several financial credit or debit institutions, one and the same first data medium, for example, a card storing these data in a magnetic in a magnetic strip or an electronic chip, allows payment via the debiting of various accounts opened with such financial institutions or via various credit bodies (such as Visa, MCC, etc.). The client therefore has available, through the same card, several possibilities of payment, and this at all points of sale accepting said card. Moreover, the input unit and the third terminal are arranged to allow a selection by the user between a payment in cash and a payment in units of compensatory value, without the number of these having to reach a predetermined threshold in order to allow this type of payment. In addition, instead of units of compensatory value, the stores or chains can grant units of credit in cash to their customers for loyalty purposes, placed on account and managed by the device according to the invention in accordance with the program which these stores or chains will have defined. Finally, the second calculation unit arranged to process payments in compensatory value from a non-financial credit accumulated by the user enables this credit to be used in various stores or chains according to programs, possibly of reciprocity, which they have established. Such programs also enable the stores or chains which design them to manage in common advertising action intended for the card holders according to the device constituting this invention.

A payment device according to the invention is preferably arranged so that the third terminal comprises an input for receiving third data relating to the management of the payments in compensatory value and a memory linked to said input and arranged to store the third data, this memory being connected to the second calculation unit which is arranged to perform said management on the basis of the third data.

This configuration enables the device to process third data relating to the loyalty programs established by the various stores or chains using said device. Thus, once the card user and the store or chain to which he is making a payment are identified on the basis of the first data, the loyalty program which falls to the user will be selected and the number of units of compensatory value to which the payment entitles him and which he can have available to make this payment will be made available to him. According to the agreements made between various stores or chains, the loyalty programs can be linked. The centralized management of the units of compensatory value acquired are equivalent to that of a bank account. With the same security procedures, the card user can therefore not lose his units of compensatory value.

Preferably, the second calculation unit comprises a generator for units of compensatory value arranged to produce on the basis of the first and second data a non-financial credit amount and to account for it, this generator being arranged to be neutralized under the control of the second control signal.

The neutralization of the compensatory value generator prevents units of compensatory value being generated whilst the third terminal is making a payment in such units and therefore is debiting the account with units of compensatory value which the card user has available at the store or chain for which the payment is intended.

According to another embodiment of the invention, the first data comprise a first field arranged so as to enter therein a first identification identifying an owner of the medium and a second field arranged to enter therein a second identification identifying a body with which the owner is associated, said selection means being arranged to read said first data and to present to said user a choice between the first and second identification as well as to produce a third control signal indicating the choice for which the user has opted.

In this way, the same card holder can be identified as a private person or as an employee/associate of a corporation with which stores or chains have made specific loyalty agreements and/or agreements on the selection of lines of products/services whose purchase, possibly limited at a certain quantity or at a certain amount, can be made from a cash amount or units of compensatory value owned by said corporation. The payment under an employee/associate identification for certain types of products/services with stores or chains which use the device according to the invention but which have not made agreements with regard to the selection of product lines with the corporation employing/associating the user of the card may also be authorized. In the case of the making of the above-mentioned selection agreements, if the payment for a product/service not selected is made by means of the device according to the invention whilst the identification as an employee/associate of the corporation who made these agreements has been chosen, these payments will not be considered by the third terminal as business but as made in a private capacity. According to the identification selected by the user and in the previous case modified where applicable by the third terminal, it uses a loyalty program and/or a specific debit/credit line. The possibility of double private/business identification offered by the device according to the invention allows easy controlled management of business costs.

In order to be able to manage a different number of units of compensatory value when a loyalty program is implemented depending on whether a payment is made to a store or chain as a private person or as an employee/associate of a corporation provision is made according to a preferred embodiment of the payment device according to the invention for the compensatory value generated to be arranged to receive the third control signal and to produce the non-financial credit amount also on the basis of the third control signal.

Preferably, the first data comprise a third field arranged to enter therein a third identification identifying at least one financial body, said selection means being arranged to read said third identification and to present to said user a choice between the financial bodies included in the third identification and to communicate the choice of the financial body to the third terminal.

The presence of a third field in the first data offers the advantage of allowing recourse to several financial institutions by means of the same first-data medium.

According to another preferred embodiment of the device according to the invention, the first terminal comprises a display unit and an interrogation device connected together, the interrogation device being arranged to interrogate the second calculation unit on the non-financial credit associated with the first data and to transmit this non-financial credit to the display unit, arranged to display the latter.

In this way, the user of the card as well as an employee at the point of sale of the store or chain in which the said card is used can display the credit relating to units of compensatory value which the user has available, according to the identification which he will have selected, which enables him to decide to make payment in cash or in units of compensatory value.

The information relating to the management of the accounts pertaining to units of compensatory value and/or credit/debit lines used to make payments by means of the device according to the invention can be stored within the third terminal and archived at a predetermined frequency (days, weeks, months). This information can serve in particular for establishing invoicing on behalf of a store or chain.

FIG. 1 illustrates by way of non-limiting example a device according to the invention comprising a medium for first data (1) consisting of a card with a magnetic strip, an input unit (2) for receiving the first data, consisting of a magnetic-strip card reader, the input unit comprising means (3) of selecting a payment mode in cash or units of compensatory value, consisting of a keypad. The input unit (2) is connected to a first terminal (4) placed in a point of sale, said terminal having an input unit (5), consisting of a keypad, second data relating to the purchase made, such as its price and the category of the service or article in question; the terminal (4) also possessing a display unit (6) for the second data, consisting of a screen. The first terminal (4) is arranged so as to communicate the first and second data to a second terminal (8) placed with a financial body which will make the payment on behalf of the user of the magnetic-strip card.

The device comprises a third terminal (9) placed with a payment management center, this terminal being arranged to regulate the communication between the first (4) and second (8) terminals. This third terminal (9) comprises a first calculation unit (10) processing the cash payments and a second calculation unit (11) for processing payments in units of compensatory value. The third terminal (9) is also arranged to receive a first control signal sent by the input unit (2) when a cash payment is selected and a second control signal sent by the input unit when a payment in units of compensatory value is selected and to execute the payment under the control of the second terminal under the control of the first control signal.

The third terminal (9) also comprises an input (12), a keypad for receiving third data relating to the management of the payments in units of compensatory value as well as a memory (13) for storing the data, connected to said input (12) and to the second calculation unit (11) arranged to effect said management on the basis of the third data. The second calculation unit (11) comprises a generator generating units of compensatory value (14) for producing on the basis of the first and second data a non-financial credit amount and to account for it, this generator being able to be neutralized under the control of the second control signal.

The generator generating units of compensatory value (14) is designed to receive a third control signal produced by the selection means (3) arranged to present to the user a choice between a first identification of the magnetic-strip card holder and a second identification of a body with which the holder is associated, these identifications being included in said first data, the third control signal being indicative of the choice in question. The generator of units of compensatory value (14) produces the non-financial credit amount also on the basis of the third control signal.

Various modes of functioning of the device according to the invention will now be described, by way of non-limiting examples, as well as the detail of the processing of a transaction by the device in one of the functioning modes described:

Direct Connected Mode

In this functioning mode of the device according to the invention, various input units and first terminals are distributed through the various points of sale of the store or chain using the device. These units are connected to a third terminal situated in a processing center chosen by the store or chain, via the data processing network of the store or chain.

The first data, relating to the identification of the card holder, possibly according to the choice as to private person or employee/associate of a corporation which it will have made by virtue of the selection means provided in the input unit contained in a magnetic strip or an electronic chip carried by a card adapted to the device according to the invention, are read by an input unit.

The data read are communicated by a first terminal to the third terminal. The identification of the store or chain and of the merchant are also communicated so as to be able to select the various payment modes accepted by the store or chain or the merchant through the use of the card as well as the loyalty program defined. There can also in particular be communicated to the third terminal data relating to the card number, to its expiry date, to the codes of the types of article making up the transaction, and to the credit in units of compensatory value possibly granted in situ by the point of sale to the user. The total amount of the transaction is in its turn communicated as well as the choice of the payment in cash or in units of compensatory value and where applicable during a payment in cash the financial institution or credit organization selected by the user by virtue of the means provided for this purpose in the input unit.

According to the loyalty program defined by the store or chain, the third terminal then proceeds with the capitalization both private and business of the units of compensatory value granted to the user and the deduction of such credit units which he has available if they are used as a payment means.

When the payment is to be made in cash by debiting a bank account, the debit authorization request to the bank is sent by the third terminal to the bank concerned or to a processing center for such requests approved by said bank, which responds to the third terminal, which sends this response to the point of sale in order to authorize or refuse the payment. When the payment is to be made via a credit body, the third terminal routes the request to this body or an approved processing center or processes it directly in accordance with the rules applied by the credit body or an agreement made between the operator of the third terminal and this body.

A concrete example of use of the device according to the invention in the functioning mode described above concerns a user having an identification as a private person and as an employee/associate of a corporation which authorizes him to make purchases of meals/drinks and likewise fuel for business purposes in certain outlets or chains with which said corporation has made agreements, using to make the payment for such purchases an account held by this corporation. When the user uses a card functioning in the device according to the invention with one of the above mentioned chains with a view to acquiring for example fuel, a meal and a magazine, the account of the company will be debited by an amount relating to the fuel or meal but not to the magazine, which, not being included in the products whose purchase is authorized for business reasons, can be acquired only privately, by debiting a private account of the user, or by means of units of compensatory value which he has acquired as a private person from this chain, according to the loyalty program established, or even as an employee/associate of the corporation, if the latter has permitted the use of the units of compensatory values credited during business purchases for making purchases of the private type.

Mode Connected on Call, Through Telephone Lines, to the Third Terminal

The processing will be identical to the connected mode detailed above apart from the fact that each transaction will require a call to the processing center where the third terminal according to the invention is situated. The speed of the communication will consequently be reduced and said processing center will have to have sufficient cascade heads to deal with the number of calls which it will receive.

Degraded Mode, with Local Processing of the Transaction

In the event of a break in communication between the point of sale and the third terminal, the transactions will be processed in so-called "degraded" mode, that is to say by applying the rules defined at the point of sale itself, in accordance with the parameters which it will have available at this moment. The consolidation with all the other transactions will take place as soon as the point of sale is once again in a position to function in connected mode.

Figure 2A:
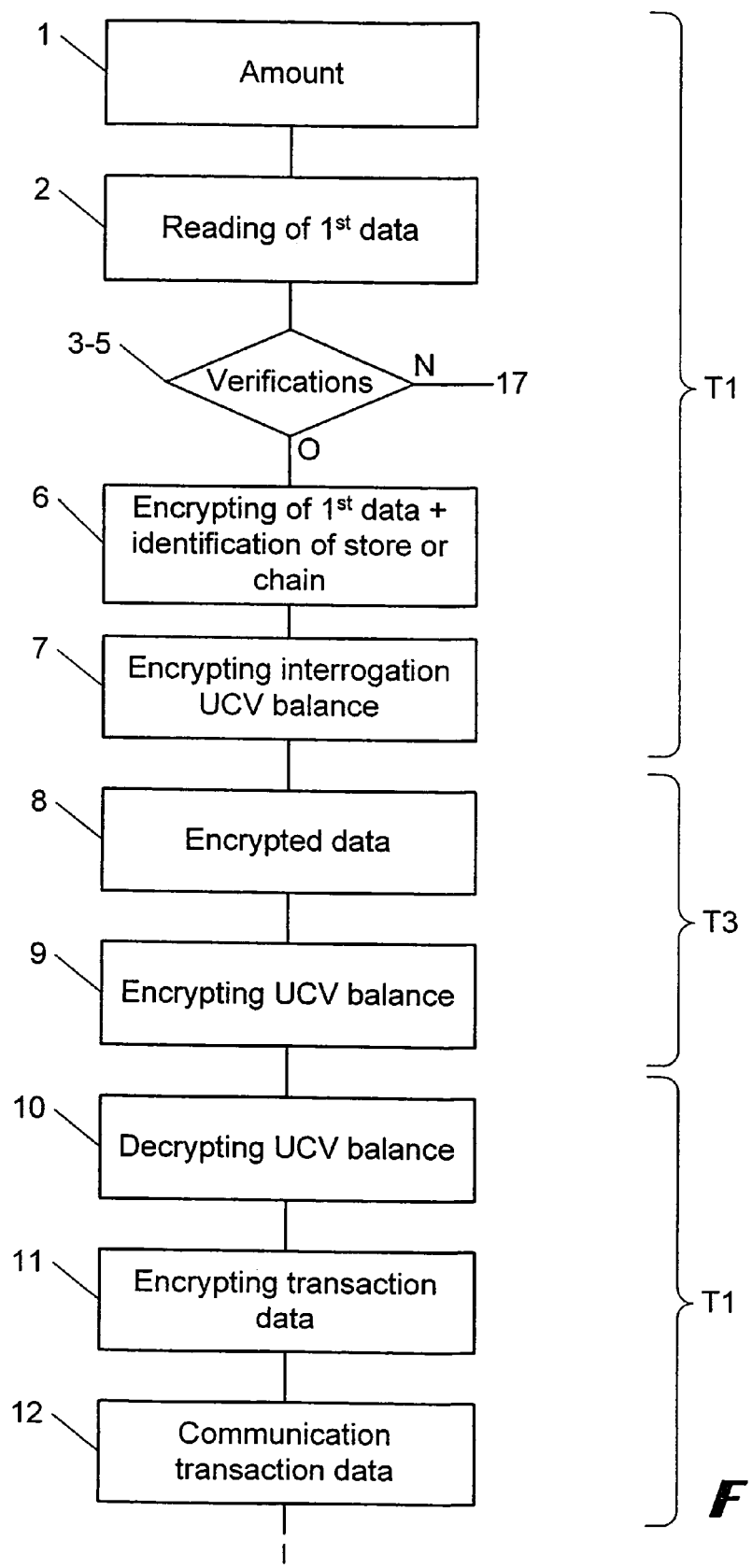
FIG. 2a–2c represent a flow diagram of payment processing in accordance with aspects of the invention.
Figure 2B:
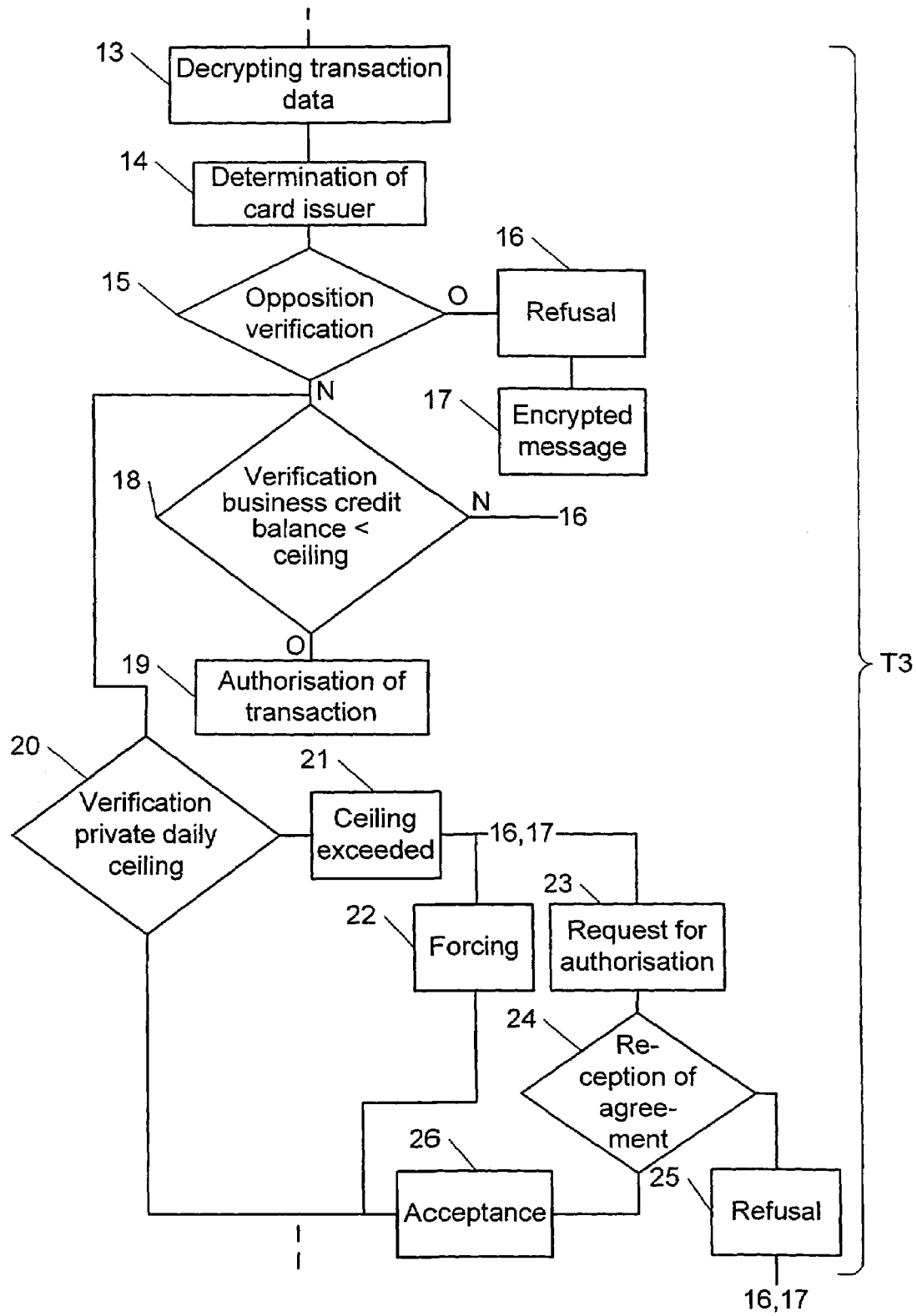
Figure 2C:
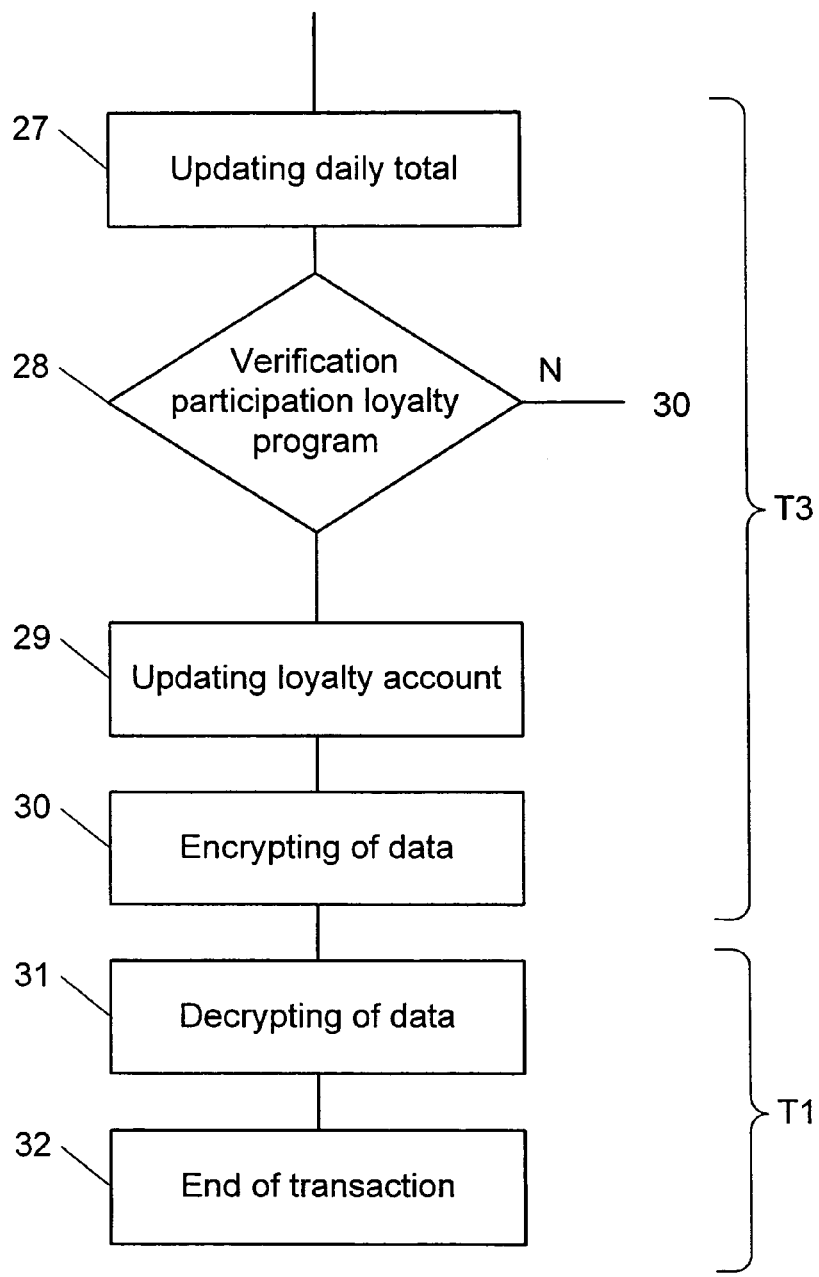

Processing of a Transaction in Direct Connected Mode:

The various steps of the processing, whose sequence is illustrated by the flow diagram in FIGS. 2a–2c, are as follows:

The various steps of the processing, whose sequence is illustrated by the flow diagram in FIGS. 2a–2c, are as follows:

1/ Communication of the amount to be paid to the first terminal via the input unit.
2/ Reading of the first data on their medium carried by the card by the user by the input unit.
3/ Verification of the length of the identification code of the card read, which determines whether it is a national or foreign card. According to circumstances, the authorized limit for making a payment without prior bank verification of the balance of the account to be debited is different, no payment being able where applicable to be made without prior verification in the case of a foreign card. In the latter case, go to paragraph 17/.
4/ Verification on the basis in particular of the card identification whether this is falsified. In this case, go to paragraph 17/.
5/ Verification of the card validity date. If it is exceeded, go to paragraph 17/.
6/ Encrypting of the first data and identification of the store or chain of the point of sale and where applicable of the latter.
7/ Introduction into the encrypted data of an interrogation of the third terminal with regard to the balance of the account of the user in units of compensatory value, where applicable according to the identification of said user as a private person or employee/associate of a corporation, so that the user can decide to use all or some of these units to make all or part of the payment. It should be noted that the device according to the invention makes it possible, in the case payments via an input unit situated outside a point of sale (for example close to fuel pumps in a service station) for this payment to give rise to the immediate generation of the units of compensatory value to which it gives entitlement, which may be themselves used to make said payment.
8/ Decrypting by the third terminal of the encrypted data communicated to it.
9/ Encrypting by the third terminal of the communication to the point of sale of the balance of the account of the user in units of compensatory value.
10/ Decrypting by the first terminal of the balance of units of compensatory value available as a payment mode at the point of sale.
11/ Encrypting by the first terminal of the second data relating to the transaction, namely transaction number, transaction amount, payment mode or modes used, number of units of compensatory value where applicable used to make all or part of the payment, product lines/services making up the transaction, for the purpose of acceptance of the purchase for business or private purposes of the products/services concerned, according to any selection agreements made between the store or chain to which the point of sale relates and the company which the user comes under as an employee/associate, payment mode or modes used.
12/ Communication of the encrypted data relating to the transaction to the third terminal.
13/ Decrypting of the data relating to the transaction by the third terminal.
14/ Determination by the third terminal of the sender of the card by means of the BIN table.
15/ Verification that the card is not included in the opposition list communicated to the third terminal by a financial institution or a credit body to which the card makes it possible to have recourse.
16/ In the event of opposition, the transaction will be refused.
17/ If paragraph 16/, an encrypted refusal message is communicated to the point of sale by the third terminal.
18/ If the transaction concerns only products/services acquired by the user as an employee/associate of a corporation, then verification of the available balance of the business debit/credit line allocated to the user for the store or chain concerned and/or the debit credit line granted to the company for the said store or chain.

Thus the device according to the invention makes it possible easily to manage business expenditure made by an employee/associate or employees/associates of a corporation by virtue of agreements concluded between this company and stores or chains distributing products/services the purchase of which is authorized for business purposes and the definition for each of the said stores or chains of a credit line for this professional expenditure, either individual for a given employee/associate or collective for all the employees/associates of the corporation. In the event of this credit being exceeded, the payment may no longer be made by debiting an account held by the corporation but only an account of which the user is the holder as a private person.

The transmission to the third terminal of the identification of the point of sale relating to a store or chain with which such agreements have been concluded also makes it possible for the purchases made at this point of sale by the user to be automatically considered to be business ones.

19/ If the amount of said transaction is less than said available balance, authorization issued by the third terminal and business account is updated.

20/ If the transaction concerns products/services acquired by the user as a private person, verification by the third terminal of the daily ceiling authorized to a user for making a payment without prior authorization from the financial institution or credit body chosen, applicable to the point of sale concerned, in accordance with the agreements made between said point of sale, the store or chain and the financial institution or credit body in question. This is because, according to the location of the point of sale and the type of product/service which it offers, this ceiling may vary, having regard to the risk of fraud relating to said location and type of product/service.

21/ In the case of an amount greater than said daily ceiling, then paragraphs 16/ and 17/.

22/ According to the agreements, the acceptance of a forcing may be tolerated or not, depending on rules to be defined. For example, such a forcing may be envisaged in the event of rupture of computer or telephone communications between the point of sale and the third terminal.

23/ In the case of exceeding said ceiling, or when no ceiling has been defined, for example when the payment is made abroad, request for authorization of payment to the financial institution or credit body is chosen by the user to make said payment.

24/ Receipt of the agreement from the financial institution or credit body mentioned above.

25/ If refusal, then paragraphs 16/, 17/.

26/ If acceptance, then updating of the daily total of the user by the third terminal.

27/ Verification that the point of sale is participating in the loyalty program defined by its store or chain.

28/ Updating of the card loyalty account, according to the number of units of compensatory value where applicable credited and/or debited during the transaction, namely either an account common to the stores or chains sharing the same loyalty program or the account of the store or chain to which the point of sale at which the transaction was made relates.

29/ Encrypting the data communicated to the point of sale, namely point of sale number, transaction number, amount granted business-wise or privately according to the case, payment authorization number, number of units of compensatory value with which where applicable the user has been credited or debited during the transaction, date and time of the transaction.

30/ Decrypting of said data by the first terminal of the point of sale.

31/ End of transaction for the point of sale.

What is claimed is:

1. A payment device comprising an input unit for receiving first data taken from a medium and identifying a user who will proceed with a payment for a purchase, said input unit arranged for connection to a first terminal to be located at a point of sale, said first terminal having a data input for receiving second data concerning said purchase, said first terminal communicating the first and second data to a second terminal placed with a financial body which is responsible for making payment on behalf of the user, a third terminal placed at a payment management center, said third terminal managing communication between the first and second terminals, said third terminal having a first calculation unit for processing payments in cash and a second calculation unit for processing payments in compensatory value from a non-financial credit accumulated by the user, said input unit being provided with a selector to indicate either a payment mode in cash or a payment mode in compensatory value and to produce a first control signal if the payment mode in cash is selected and a second control signal if the compensatory value mode is chosen, said third terminal also receiving the first and second control signals and executing payment under control of the second control signal and to transmit the first and second data to the second terminal under the control of the first control signal.

2. The payment device of claim 1, wherein said third terminal comprises an input for receiving third data relating to management of the payments in compensatory value and a memory linked to said input and arranged to store the third data, said memory connected to said second calculation unit performs said processing on the basis of the third data.

3. The payment device of claim 1 or 2, wherein said second calculation unit comprises a generator for units of compensatory value arranged to produce on a basis of the first and second data a non-financial credit amount and to account for the non-financial credit, said generator of compensatory value being neutralized under a control of said second control signal.

4. The payment device of claim 1 or 2, wherein said first data comprise a first field arranged so as to enter therein a first identification identifying an owner of the medium and a second field arranged to enter therein a second identification identifying a body with which the owner is associated, said selector reading said first data and present to said user a choice between the first and second identification and to produce a third control signal indicating the choice for which the user has opted.

5. The payment device of claim 1 or 2, wherein said second calculation unit comprises a generator for units of compensatory value arranged to produce on a basis of the first and second data a non-financial credit amount and to account for the non-financial credit, said generator of compensatory value being neutralized under a control of said second control signal and wherein said first data comprise a first field to enter therein a first identification identifying an owner of the medium and a second field to enter therein a second identification identifying a body with which the owner is associated, said selector reading said first data and present to said user a choice between the first and second identification and to produce a third control signal indicating the choice for which the user has opted and wherein said compensatory value generator receives said third control signal and produces said non-financial credit amount also on the basis of said third control signal.

6. The payment device of claim 1 or 2, wherein said first data comprise a third field arranged to enter therein a third identification identifying at least one financial body, said selector reading said third identification and presenting to said user a choice between financial bodies included in said third identification and communicating the choice of the financial body to said third terminal.

7. The payment device of claim 1 or 2, wherein said first terminal comprises a display unit and an interrogation device connected together, said interrogation device interrogating said second calculation unit on said non-financial credit associated with the first data and transmitting the non-financial credit to the display unit to display said non-financial credit.

* * * * *